(12) United States Patent
Azusawa et al.

(10) Patent No.: US 7,388,604 B2
(45) Date of Patent: *Jun. 17, 2008

(54) IMAGE PICKUP DEVICE AND APPARATUS INCLUDING VIBRATION CORRECTION MEANS

(75) Inventors: Katsumi Azusawa, Konosu (JP); Masamichi Toyama, Yokohama (JP); Shigeru Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 834 days.

This patent is subject to a terminal disclaimer.

(21) Appl. No.: 10/698,367

(22) Filed: Nov. 3, 2003

(65) Prior Publication Data

US 2004/0090531 A1 May 13, 2004

Related U.S. Application Data

(63) Continuation of application No. 09/356,692, filed on Jul. 20, 1999, now abandoned, which is a continuation of application No. 08/380,336, filed on Jan. 30, 1995, now Pat. No. 6,014,169, which is a continuation of application No. 07/928,099, filed on Aug. 13, 1992, now abandoned, which is a continuation of application No. 07/715,457, filed on Jun. 14, 1991, now abandoned.

(30) Foreign Application Priority Data

| Jun. 19, 1990 | (JP) | ................................... 2-161905 |
| Jun. 28, 1990 | (JP) | ................................... 2-171590 |

(51) Int. Cl.
*H04N 5/228* (2006.01)
*G03B 17/00* (2006.01)

(52) U.S. Cl. ...................................... 348/208.8; 396/55

(58) Field of Classification Search ............. 348/208.8, 348/208.2, 208.4; 396/55
See application file for complete search history.

(56) References Cited

U.S. PATENT DOCUMENTS

| 4,623,930 | A | * | 11/1986 | Oshima et al. | ............ 348/208.2 |
| 4,717,958 | A | * | 1/1988 | Gal et al. | ................. 348/208.6 |
| 4,740,828 | A | * | 4/1988 | Kinoshita | ................ 348/222.1 |
| 4,780,739 | A | * | 10/1988 | Kawakami et al. | ..... 348/208.99 |
| 4,788,596 | A | * | 11/1988 | Kawakami et al. | ..... 348/208.11 |
| 5,012,270 | A | * | 4/1991 | Sekine et al. | .................. 396/54 |
| 5,053,875 | A | * | 10/1991 | Ishii et al. | .............. 348/208.99 |
| 5,117,246 | A | * | 5/1992 | Takahashi et al. | ...... 348/208.99 |
| 5,218,442 | A | * | 6/1993 | Hamada et al. | ........ 348/208.15 |
| 5,282,044 | A | * | 1/1994 | Misawa et al. | ................. 396/55 |
| 5,561,498 | A | | 10/1996 | Sekine et al. | ............ 348/208.8 |
| 5,596,366 | A | | 1/1997 | Takashima | .................. 348/208 |

* cited by examiner

*Primary Examiner*—Nhan T Tran
(74) *Attorney, Agent, or Firm*—Fitzpatrick, Cella, Harper & Scinto

(57) ABSTRACT

An image pickup apparatus includes an image pickup element for converting an optical image on a focal plane into an electrical image signal and outputting the electrical image signal. A vibration sensor detects a vibration amount of an image pickup apparatus main body, and an optical axis decentering member is provided for decentering an optical axis to cause the optical image to coincide with a predetermined position on the focal plane of the image pickup element. A driving control circuit controls a decentering amount of the optical axis decentering member on the basis of a detection output from the vibration sensor, and a control circuit controls the driving control circuit so that the decentering member is operated if the image pickup element is outputting the electrical signal.

2 Claims, 5 Drawing Sheets

IMAGE PICKUP DEVICE AND APPARATUS INCLUDING VIBRATION CORRECTION MEANS

The present application is a continuation application of application Ser. No. 09/356,692, filed Jul. 20, 1999, now abandoned, which is a continuation of application Ser. No. 08/380,336, filed Jan. 30, 1995 (now U.S. Pat. No. 6,014,169, issued Jan. 11, 2000), which is a continuation of application Ser. No. 07/928,099, filed Aug. 13, 1992 (abandoned), which is a continuation of application Ser. No. 07/715,457, filed Jun. 14, 1991 (abandoned), the entire contents of which are incorporated herein by reference.

BACKGROUND OF THE INVENTION

1. Field of the Invention

The present invention relates to an image pickup apparatus such as a video camera.

2. Related Background Art

In recent years, video cameras have become remarkably popular since they have compact, lightweight structures, variable magnifications, and multifunctions.

In the above-mentioned video camera, most functions associated with an image pickup operation are automated. Therefore, an unsuccessful image pickup operation caused by the functions of the video camera itself rarely occurs.

The video camera is most frequently used in a hand held state. In this state, the frame may be considered to be always vibrated. In recent years, degradation of image quality caused by the frame vibration, and an uncomfortable situation such as "video sickness" are discussed as problems.

As a means for eliminating the above-mentioned frame vibration, an image stabilization device utilizing a gyro mechanism is conventionally known.

In this device, a lens barrel system is movably supported by a gyro mechanism to obtain a stable image. However, this device makes the camera main body bulky, and also causes an increase in weight.

In recent years, an image pickup apparatus, which comprises image vibration correction means comprising optical axis decentering means, such as a variable angle prism, for decentering an optical axis of an image pickup optical system according to a vibration of a camera and thereby locating an optical image on a predetermined focal plane of an image pickup element, has been developed.

The variable angle prism has the following structure. That is, a liquid having a given refractive index is sealed in an accordion-like chamber having a bellows clamped between two transparent plates. The transparent plate on the object side is tilted by a driving mechanism comprising a magnetic circuit, thereby decentering a photographing optical axis.

In the above-mentioned apparatus, since the optical axis is decentered by the variable angle prism, a lens barrel system need not be moved, and increases in the size and weight of the camera main body can be minimized. Thus, a good image can be obtained by effectively preventing an image vibration.

In the above-mentioned apparatus, since an image vibration correction is performed by tilting the transparent plate of the variable angle prism by the driving mechanism comprising the magnetic circuit, power consumption is increased as compared to a normal photographing mode. Thus, a demand has arisen for efficient battery saving means.

In addition, the apparatus using the variable angle prism suffers from the following problem.

In the image pickup apparatus comprising the image vibration correction means, e.g., the optical axis decentering means such as the variable angle prism, when the image vibration correction mode is disabled during an image recording operation, a tilting state by the driving mechanism for driving the transparent plate is released, and a centering operation occurs. That is, the two transparent plates become parallel to each other due to liquidity of the liquid sealed between them.

For this reason, discontinuous finder images are formed, and a user may feel uneasy.

SUMMARY OF THE INVENTION

The present invention has been made to solve the conventional problems, and has as its first object to provide an image pickup apparatus which can effectively perform an image vibration correction, and can also effectively perform an efficient battery saving operation.

In order to achieve this object, according to a preferred aspect of the present invention, there is disclosed an image pickup apparatus comprising image pickup-means for converting an optical image on a focal plane into an electrical image signal, and outputting the electrical image signal, vibration detection means for detecting a vibration amount of an image pickup apparatus main body, optical axis decentering means for decentering an optical axis so as to cause the optical image to coincide with a predetermined position on the focal plane of the image pickup means, driving control means for controlling a decentering amount of the optical axis decentering means on the basis of a detection output from the vibration detection means, and control means for, when the image pickup means outputs the electrical image signal, controlling to permit a driving operation of the optical axis decentering means by the driving control means.

According to another preferred aspect of the present invention, there is disclosed an image pickup apparatus comprising image pickup means for converting an optical image on a focal plane into an electrical image signal, recording/reproduction means for recording the electrical image signal from the image pickup means, and reproducing the recorded signal, vibration detection means for detecting a vibration amount of an image pickup apparatus main body, optical axis decentering means for decentering an optical axis so as to cause the optical image to coincide with a predetermined position on the focal plane of the image pickup means, driving control means for controlling a decentering amount of the optical axis decentering means on the basis of a detection output from the vibration detection means, and control means for, when the recording/reproduction means reproduces the recorded signal, stopping operations of the optical axis decentering means and the driving control means.

Thus, according to the present invention, when the image pickup means outputs the electrical image signal, control is made to permit a driving operation of the optical axis decentering means by the driving control means. When the recording/reproduction means reproduces the recorded signal, the operations of the optical axis decentering means and the driving control means are stopped. Thus, an image vibration correction can be effectively performed, and an efficient battery saving operation can also be effectively attained.

It is the second object of the present invention to provide an image pickup apparatus which can effectively perform an image vibration correction, and an efficient battery saving operation since it controls to permit a driving operation of the optical axis decentering means by the driving control means when the image pickup means outputs an electrical image signal, and stops operations of the optical axis decentering means and the driving control means when the recording/reproduction means reproduces a recorded signal.

It is the third object of the present invention to solve the conventional problems, and to provide an image pickup apparatus which can effectively perform image vibration correction, and can effectively prevent discontinuous images even when an image vibration correction mode is disabled during an image recording operation.

It is the fourth object of the present invention to provide an image pickup apparatus which can effectively perform an image vibration correction since it controls to hold an optical axis decentering position of optical axis decentering means when an optical axis decentering driving operation by the optical axis decentering means is stopped during an operation of a recording means, and can effectively prevent discontinuous images even when an image vibration correction mode is disabled during an image recording operation.

It is the fifth object of the present invention to provide an image pickup apparatus which can effectively perform an image vibration correction, and can effectively prevent formation of discontinuous monitor images as finder images even when an image vibration correction mode is disabled during an image recording operation performed.

In order to achieve the above objects, according to still another preferred aspect of the present invention, there is disclosed an image pickup apparatus comprising image pickup means for converting an optical image on a focal plane into an electrical image signal, recording means for at least recording the electrical image signal from the image pickup means, vibration detection means for detecting a vibration amount of an image pickup apparatus main body, optical axis decentering means for decentering an optical axis so as to cause the optical image to coincide with a predetermined position on the focal plane of the image pickup means, driving control means for controlling a decentering amount of the optical axis decentering means on the basis of a detection output from the vibration detection means, and control means for, when an optical axis decentering driving operation by the optical axis decentering means is stopped during an operation of the recording means, controlling to hold an optical axis decentering position of the optical axis decentering means.

Other objects and features of the present invention will become apparent from the following description taken in conjunction with the accompanying drawings.

DETAILED DESCRIPTION OF THE PREFERRED EMBODIMENTS

Figure 1:
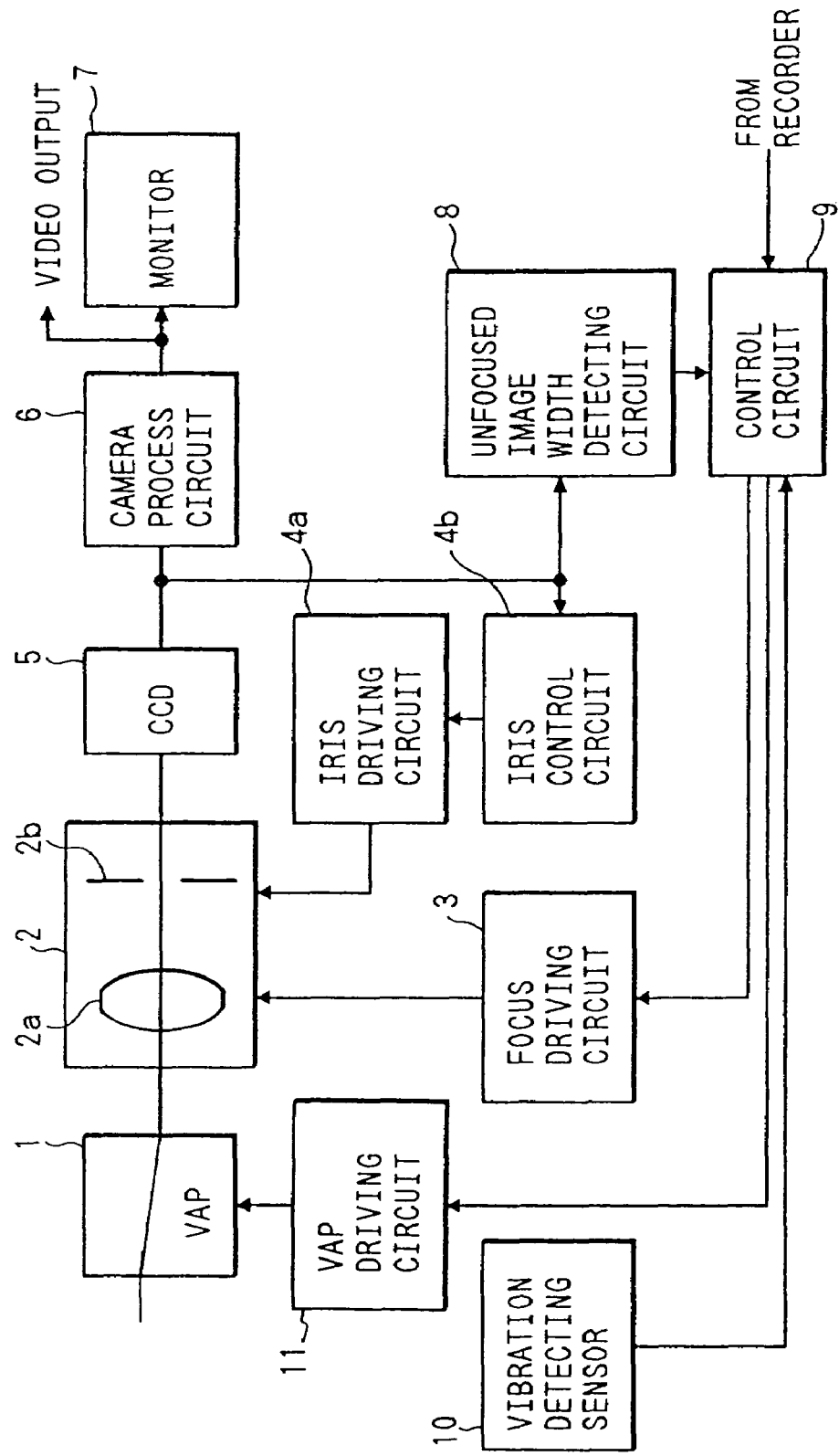
FIG. 1 is a block diagram showing an arrangement of an image pickup apparatus according to the first embodiment of the present invention.

FIG. 1 is a block diagram for explaining an image pickup apparatus according to an embodiment of the present invention.

In FIG. 1, the image pickup apparatus includes a VAP (Variable Angle Prism) 1 serving as an optical axis decentering means, and an image pickup optical system 2 including an image pickup lens 2a including a focusing lens, and an aperture stop 2b. The image pickup lens 2a is driven by a focus driving circuit 3, and the aperture stop 2b is driven by an iris driving circuit 4a and an iris control circuit 4b so as to control an incident light amount of the image pickup optical system.

The apparatus also includes a CCD 5 as an image pickup element for photoelectrically converting an object image formed on a focal plane by the image pickup optical system 2 into an image pickup signal, and a camera process circuit 6 for executing predetermined processing, e.g., gamma correction, blanking processing, addition of a synchronization signal, and the like, of a video signal which is output from the CCD 5 and is amplified by a preamplifier (not shown), so as to convert the video signal into a standard television signal, and outputting the standard television signal from a video output terminal. The television signal output from the camera process circuit 6 is output to a video recorder section (not shown), and is also supplied to a monitor 7 such as an electronic viewfinder.

Furthermore, the apparatus includes an unfocused image width detecting circuit 8 for detecting an unfocused image width (width of an edge portion of an object image) of an object image from the video signal output from the CCD 5. The circuit 8 performs focus detection by utilizing a nature that an unfocused image width of an object is decreased as a focusing state approaches an in-focus state.

Moreover, the apparatus includes a control circuit 9 comprising, e.g., a microcomputer for controlling the entire system. The control circuit 9 comprises an I/O port, an A/D converter, a ROM, and a RAM. The control circuit 9 fetches unfocused image width data output from the unfocused image width detecting circuit 8, and peak value data of high-frequency components from a band-pass filter (not shown), and outputs a predetermined driving control signal to the focus driving circuit 3 to drive the image pickup lens 2a so that an unfocused image width in one field period of a video signal is minimized, and a peak value of high-frequency components is maximized. The control circuit 9 receives a detection signal from a vibration detecting sensor 10 for detecting a vibration amount of a video camera main body as the image pickup apparatus, and outputs a correction signal for correcting an optical axis in accordance with the vibration amount given by the detection signal, and an operation mode of the video camera main body to a VAP driving circuit 11. The VAP driving circuit 11 tilts the VAP 1 to decenter the optical axis, so that an optical image from the image pickup optical system 2 can be formed on a predetermined position of the focal plane of the CCD 5.

The VAP 1, the vibrating detecting sensor 10, and the VAP driving circuit 11 will be described in more detail below with reference to FIG. 2.

Figure 2:
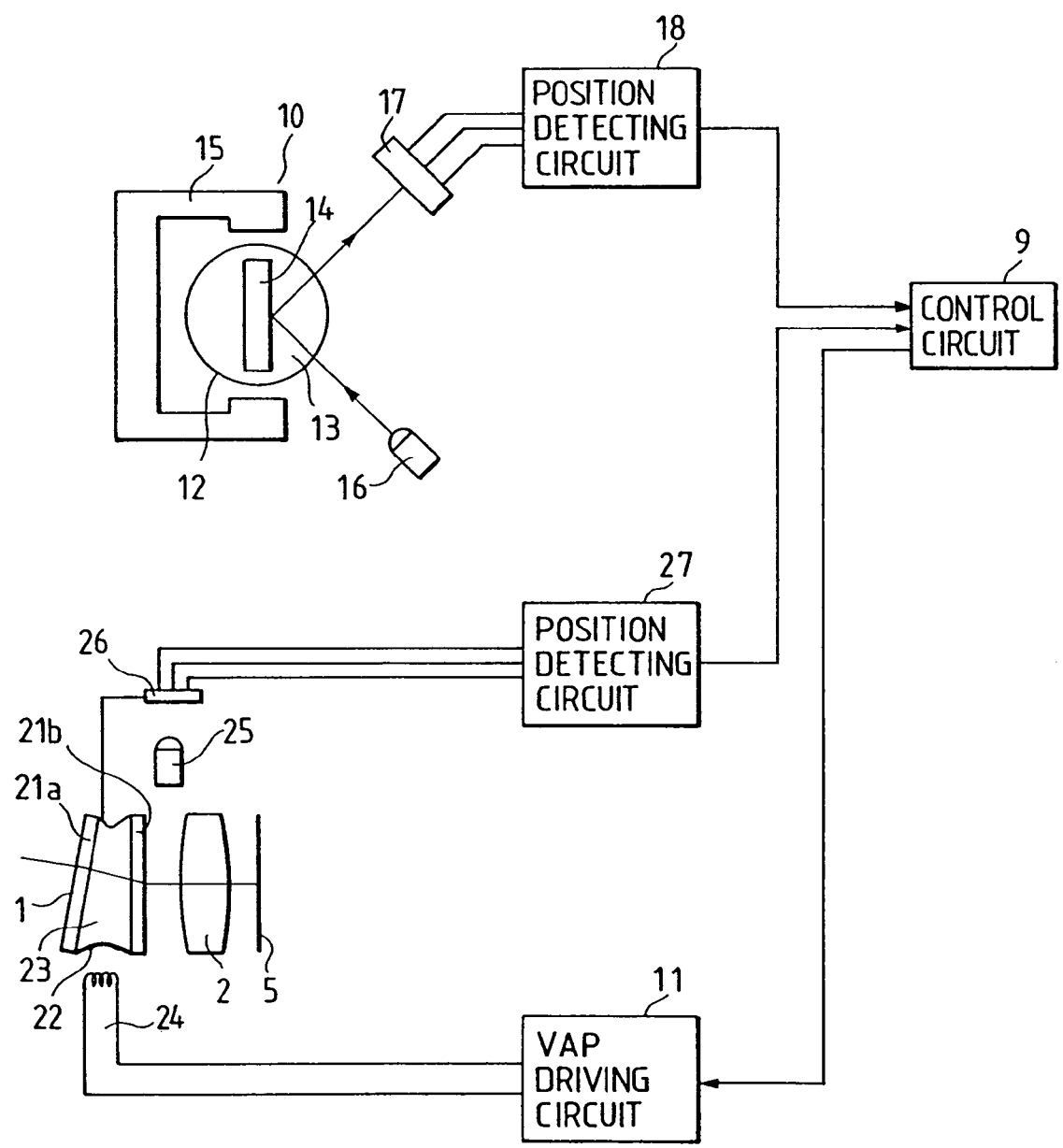
FIG. 2 is a block diagram for explaining in detail a variable angle prism, a vibration detecting sensor, and a VAP driving circuit shown in FIG. 1.

The vibration detecting sensor 10 has a structure as shown in FIG. 2. More specifically, a cylindrical case 12 is filled with a liquid 13 having a predetermined refractive index, and a float 14 which is rotatable about a predetermined rotational axis is arranged in the liquid 13. In a vibration free state, the float 14 is held at a predetermined position by a closed magnetic circuit constituted by a permanent magnet 15 arranged to surround the case 12. When the video camera main body is vibrated, and the float 14 is rotated relative to the case 12, signal light from a light-emitting element 16 is reflected by the surface of the float 14, and is incident on a light-receiving element 17 used for position detection. Therefore, the light incident position onto the light-receiving element 17 is changed depending on the position of the float 14, and an output signal is changed. The output signal from the light-receiving element 17 is output to the control circuit 9 via a position detecting circuit 18.

On the other hand, the VAP 1 has the following structure. That is, a liquid 23 having a predetermined refractive index is sealed in an accordion-like chamber 22 having a bellows clamped between two transparent plates 21a and 21b. The VAP 1 is arranged on the front surface side of the image pickup optical system 2 and the CCD 5. In accordance with an output from the position detecting circuit 18 on the side of the vibration detecting sensor 10, a magnetic circuit 24 is driven by the VAP driving circuit 11 controlled by the control circuit 9, and the transparent plate 21a on the object side of the VAP 1 is tilted. The tilting amount of the transparent plate 21a is detected by detectors. 25 and 26, and output signals from these detectors are output to the control circuit 9 via a position detecting circuit 27. The control circuit 9 controls the VAP driving circuit 11 to drive the magnetic circuit 24, thereby tilting the transparent plate 21a of the VAP 1, so that a difference between the output from the position detecting circuit 18 on the side of the vibration detecting sensor 10, and the output from the position detecting circuit 27 on the side of the VAP 1 becomes "0".

Figure 3:
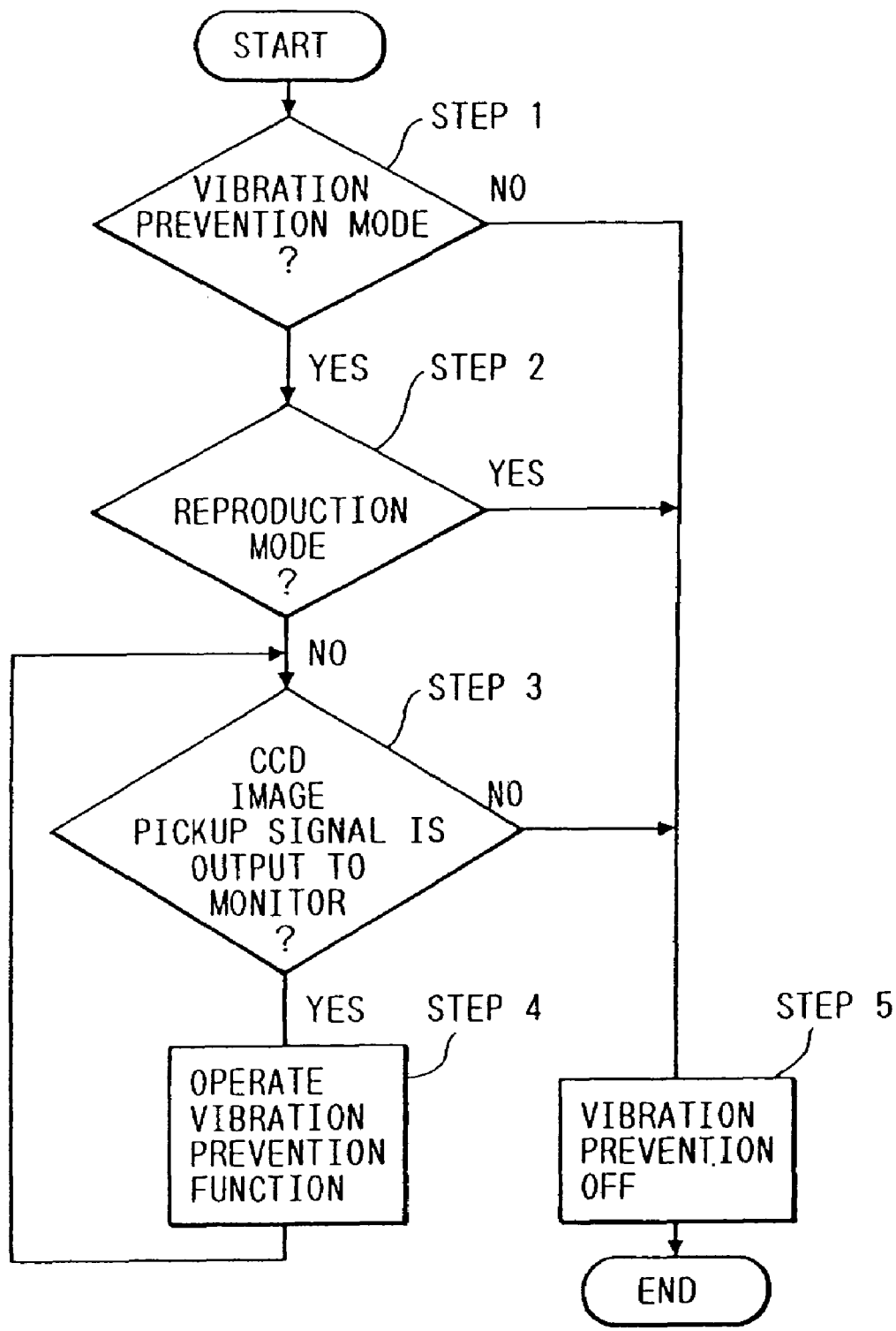
FIG. 3 is a flow chart for explaining an operation of a control circuit shown in FIG. 1.

The operation of the control circuit 9 described above as the characteristic feature of the image pickup apparatus of the present invention will be described below with reference to the flow chart shown in FIG. 3.

It is checked if the video camera is set in a vibration prevention mode (step 1). If it is determined that the vibration prevention mode is set, it is then checked if the video camera is set in a reproduction mode (step 2). If it is determined that the reproduction mode is not set, it is checked if an image based on an image pickup signal from the CCD 5 is output to the monitor 7 (e.g., in an REC pause or REC state) (step 3). If it is determined that the image is output to the monitor 7, the vibration prevention function is operated (step 4). More specifically, when a picked-up image can be output to the monitor 7, the vibration prevention function is enabled even when no image recording operation is performed.

If it is determined that no image based on an image pickup signal from the CCD 5 is output to the monitor 7, or if it is determined in step 1 that the vibration prevention mode is not set, and if it is determined in step 2 that the reproduction mode is set, the vibration prevention function is turned off (step 5).

Therefore, in this embodiment, when an image based on an image pickup signal from the CCD 5 is output to the monitor 7, the control circuit 9 controls to enable the driving operation of the VAP 1 via the VAP driving circuit 11. When the recorder (not shown) outputs a signal representing the reproduction mode to the control circuit 9, the control circuit 9 controls to stop the operations of the VAP 1 and the VAP driving circuit 11. As a result, an image vibration correction can be effectively performed, and an efficient battery saving operation can be effectively attained.

The above embodiment exemplifies a so-called TV-AF system (auto focus system using a television signal) wherein focus detection is performed by utilizing the nature that an unfocused image width of an object is decreased as a focusing state approaches an in-focus state. However, this embodiment may be applied to an active AF system comprising a light-emitting element, and a light-receiving element.

In the above embodiment, an image vibration correction mechanism is integrally arranged in the video camera as the image pickup apparatus. However, the VAP, the vibration detecting sensor, the VAP driving circuit, and the control circuit may be separately arranged as an adapter detachable from the video camera main body. Furthermore, the control circuit may be used commonly by the video camera main body.

In the image pickup apparatus of the present invention, as described above, when an electrical image signal is output from an image pickup means, control is made to permit a driving operation of an optical axis decentering means by a driving control means. When a recording/reproduction means reproduces a recorded signal, the operations of the optical axis decentering means and the driving control means are stopped. Therefore, an image vibration correction can be effectively performed, and an efficient battery saving operation can be effectively attained.

The second embodiment of the present invention will be described below.

This embodiment discloses an image pickup apparatus which can prevent discontinuous and poor images from being output as finder images when an image vibration correction device is mounted on, e.g., a video camera, and an operation mode of the camera is changed.

This embodiment will be described below. The circuit arrangement of this embodiment, and a VAP, a vibration detecting sensor, and a VAP driving circuit as a vibration correction means are the same as those in the embodiment shown in FIGS. 1 and 2, and a difference is only a control program of a control circuit 9 for controlling the overall apparatus.

The operation of the control circuit 9 as the characteristic feature of the image pickup apparatus of the present invention will be described below with reference to the flow charts shown in FIGS. 4 and 5.

The VAP as the optical axis decentering means used in the video camera as the image pickup apparatus of the present invention can be used in a full auto mode of the video camera, and in a manual mode capable of turning on/off the vibration prevention function according to a user's will.

Figure 4:
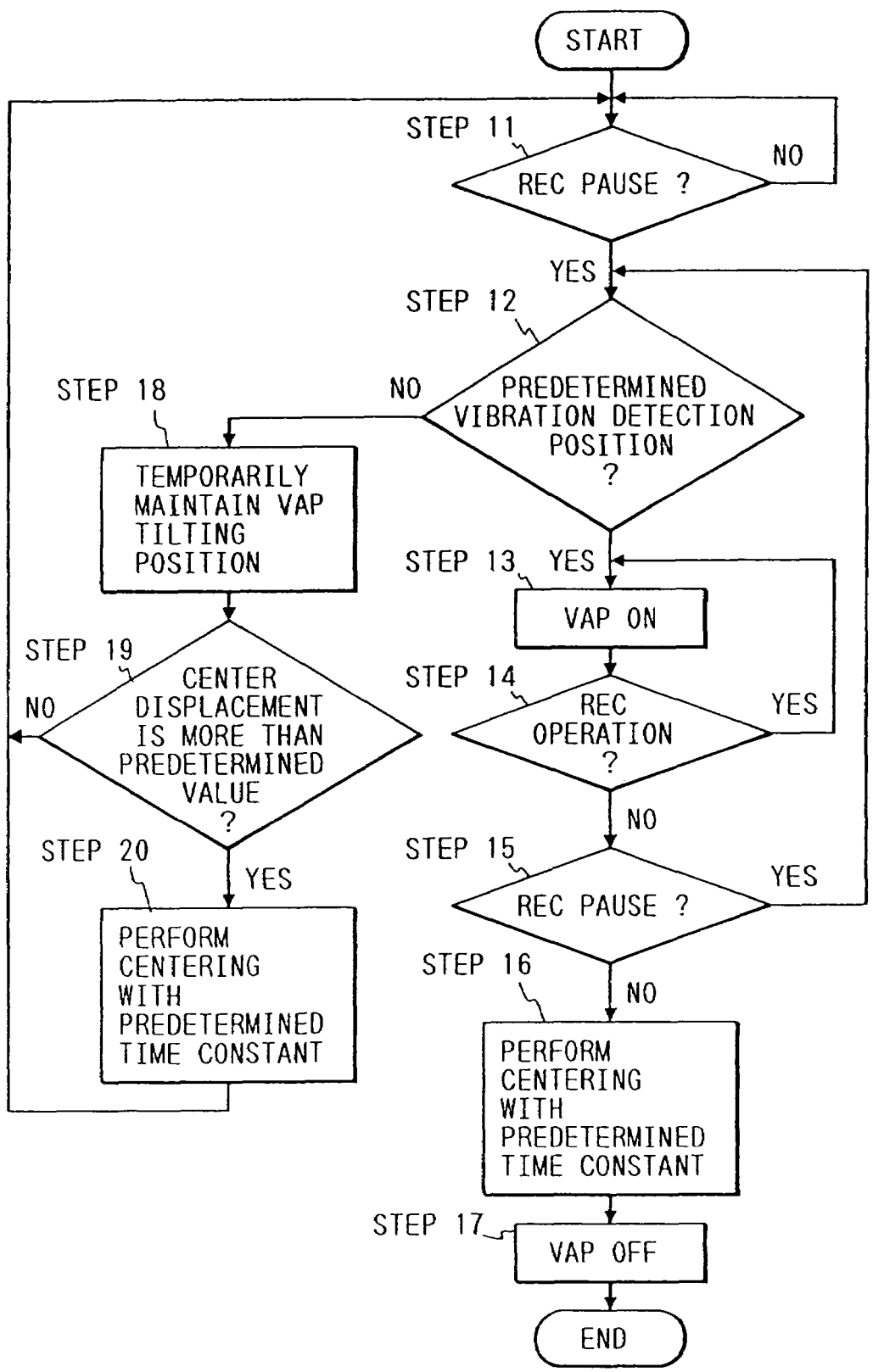
FIGS. 4 and 5 are flow charts for explaining an operation of a control circuit according to the second embodiment of the present invention.

As shown in FIG. 4, when the full auto mode of the video camera is set, it is checked if the video camera is set in an REC pause state (step 11). If it is determined that the REC pause state is set, it is checked if an output signal from the vibration detecting sensor 10 exceeds a predetermined value (step 12). If it is determined that the output signal exceeds the predetermined value, the VAP 1 is operated (step 13). It is then checked if the camera is set in an REC state (step 14). If it is determined that the REC state is set, an image recording state with the ON vibration prevention function in which the VAP 1 is operated is set. However, if it is determined that the REC state is not set, it is checked if the REC pause state is set (step 15). If it is determined that the REC pause state is set, the flow returns to step 2. If it is determined that the REC pause state is not set, a centering operation is performed, i.e., the tilting position of the transparent plate 21a of the VAP 1 which decenters the optical axis on the basis of a predetermined time constant is gradually returned to a centering position where the transparent plates 21a and 21b are parallel to each other (step 16). Upon completion of the centering operation, the vibration prevention function is turned off (step 17).

If it is determined in step 2 that the output signal from the vibration detecting sensor 10 is below the predetermined value, the tilting position of the VAP 1 is temporarily held (step 18). It is then checked if the tilting position of the transparent plate 21a of the VAP 1 is offset from the center by a predetermined value or more (step 19). If it is determined that the tilting position is offset from the center, a centering operation is performed, i.e., the tilting position of the transparent plate 21a of the VAP 1 which decenters the optical axis is gradually returned to a centering position where the transparent plates 21a and 21b are parallel to each other (step 20). Upon completion of the centering operation, the flow returns to step 1.

Therefore, when the video camera is set in the full auto mode, if the video camera main body is vibrated by a predetermined value or more by, e.g., camera shake in the REC pause state wherein an optical image from the image pickup optical system is output to the monitor 7 as the viewfinder, the vibration prevention function is automatically operated. In a vibration prevention function unnecessary state, e.g., when a vibration by camera shake is stopped, the tilting position of the transparent plate 21a of the VAP 1 is temporarily held, and the centering operation is gradually performed. In this manner, when the vibration prevention function is switched between ON and OFF states, an image from the monitor 7 as the viewfinder does not give an uneasy feeling to a user since the centering operation of the VAP 1 is gradually performed without immediately changing the optical axis.

The vibration prevention function in the manual mode will be described below with reference to the flow chart shown in FIG. 5.

Figure 5:
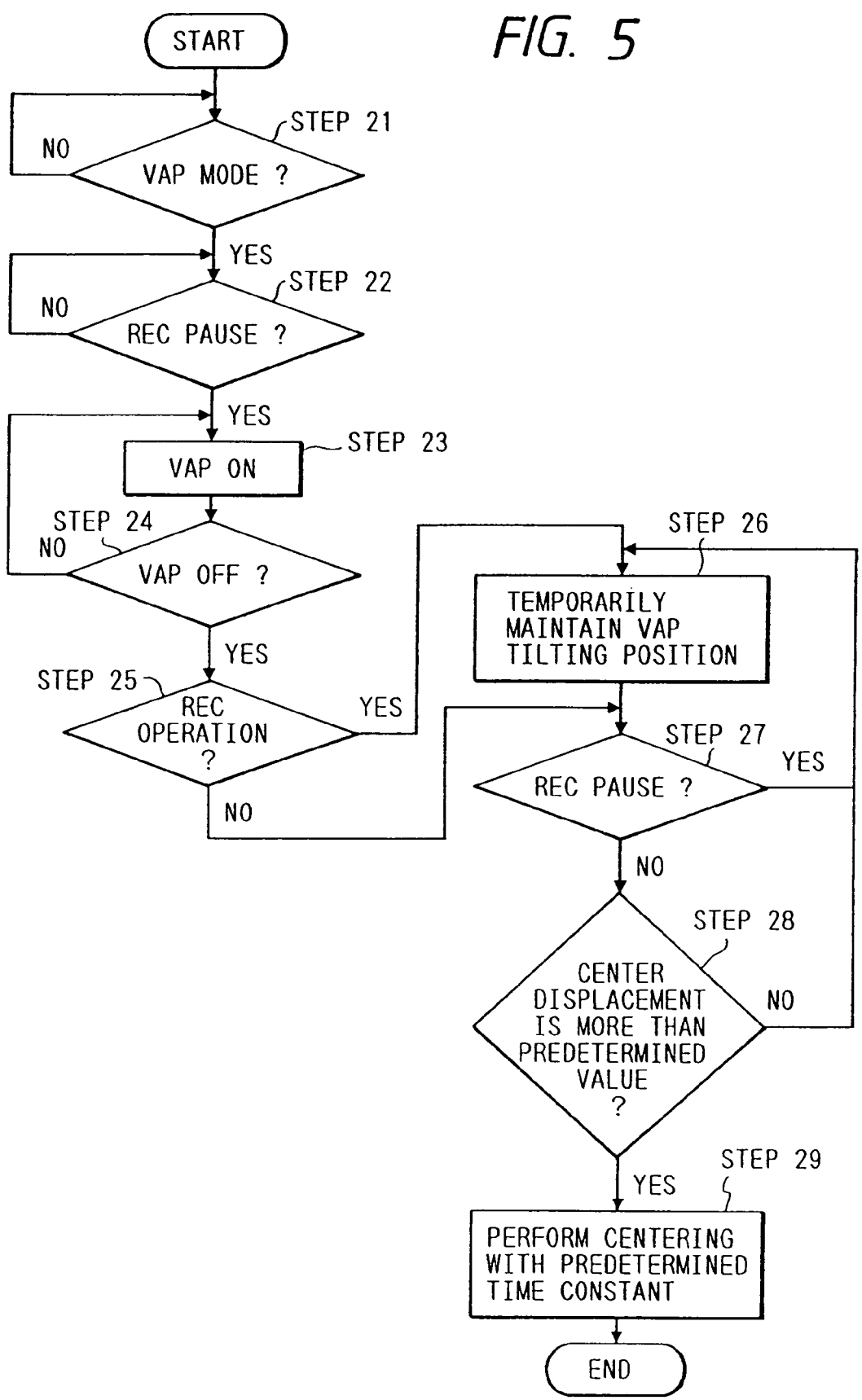

As shown in FIG. 5, it is checked if the vibration prevention function (VAP mode) is selected (step 21). If it is determined that the VAP mode is selected, it is then checked if the camera is set in the REC pause state (step 22). If it is determined that the REC pause state is set, the VAP mode is enabled (step 23). If it is checked if the VAP mode is turned off (step 24). It is determined that the VAP mode is OFF, it is checked if the REC state is set (step 25). If it is determined that the REC state is set, the tilting position of the transparent plate 21a of the VAP 1 is temporarily held by the driving operation of the magnetic circuit 24 (step 26). Thereafter, it is checked if the REC pause state is set (step 27). If the REC pause state is released, it is checked if the tilting position of the transparent plate 21a of the VAP 1 is offset from the center by a predetermined value or more (step 28). If it is determined that the tilting position is offset from the center, a centering operation is performed, i.e., the tilting position of the transparent plate 21a of the VAP 1 which decenters the optical axis on the basis of the predetermined time constant is gradually returned to a centering position where the transparent plates 21a and 21b are parallel to each other (step 29).

Therefore, in the vibration prevention function in the manual mode, even when the vibration prevention function is switched between ON and OFF states, an image from the monitor 7 as the viewfinder does not give an uneasy feeling to a user since the centering operation of the VAP 1 is gradually performed without immediately changing the optical axis.

In this manner, in the above embodiment, an image vibration by camera shake can be effectively corrected, and even when an image vibration correction function as the vibration prevention function is switched between ON and OFF states, an image on the monitor as the finder can be effectively prevented from being discontinuously formed.

The above embodiment exemplifies a so-called TV-AF system (auto focus system using a television signal) wherein focus detection is performed by utilizing the nature that an unfocused image width of an object is decreased as a focusing state approaches an in-focus state. However, this embodiment may be applied to an active AF system comprising a light-emitting element, and a light-receiving element.

In the above embodiment, an image vibration correction mechanism is integrally arranged in the video camera as the image pickup apparatus. However, the VAP, the vibration detecting sensor, the VAP driving circuit, and the control circuit may be separately arranged as an adapter detachable from the video camera main body. Furthermore, the control circuit may be used commonly by the video camera main body.

As described above, according to the image pickup apparatus of the present invention, an image vibration correction can be effectively performed, and even when an image vibration correction mode is disabled during an image recording operation performed while the image vibration correction mode is enabled, monitor images as finder images can be effectively prevented from being discontinued.

What is claimed is:

1. An image pickup apparatus comprising:
   image pickup means for converting an optical image formed on an image sensing plane into an electrical image signal and outputting the electrical image signal;
   recording means for recording the electrical image signal output from said image pickup means;
   detection means for detecting a vibration amount of said image pickup apparatus;
   correcting means for optically correcting a movement of the optical image formed on the image sensing plane by shifting an optical axis;
   driving means for driving said correcting means on the basis of a detection output of said detection means; and
   control means for controlling said driving means and said correcting means to hold an optically correcting position of said correcting means in the case that the optically correcting operation of said correcting means is stopped during a recording operation of said recording means,
   wherein said control means releases the held optically correcting position of said correcting means in accordance with stopping of a recording operation of said recording means.

2. An image pickup apparatus comprising:
   image pickup means for converting an optical image formed on an image sensing plane into an electrical image signal and outputting the electrical image signal;
   recording/reproduction means for recording the electrical image signal output from said image pickup means and reproducing a recorded electrical image signal;
   detection means for detecting a vibration amount of said image pickup apparatus;
   correcting means for optically correcting a movement of the optical image formed on the image sensing plane by shifting an optical axis;
   driving means for driving said correcting means on the basis of a detection output of said detection means; and
   control means for controlling said driving means and said correcting means to hold the optically correcting position of said correcting means in the case that the optically correcting operation of said correcting means is stopped during a recording operation of said recording means,
   wherein said control means locks a correcting position of said correcting means during reproduction of said recording/reproduction means,
   wherein said control means releases the locked position of said correcting means in accordance with stopping of a recording operation of said recording means.

* * * * *

UNITED STATES PATENT AND TRADEMARK OFFICE
CERTIFICATE OF CORRECTION

PATENT NO. : 7,388,604 B2  
APPLICATION NO. : 10/698367  
DATED : June 17, 2008  
INVENTOR(S) : Katsumi Azusawa et al.

It is certified that error appears in the above-identified patent and that said Letters Patent is hereby corrected as shown below:

COLUMN 2:  
Line 20, "pickup-means" should read --pickup means--.

COLUMN 3:  
Line 23, "operation performed." should read --operation.--.

COLUMN 5:  
Line 15, "detectors." should read --detectors--.

COLUMN 7:  
Line 27, "If it" should read --It--, and "It is" should read --If it is--.

Signed and Sealed this

Thirtieth Day of December, 2008

JON W. DUDAS  
*Director of the United States Patent and Trademark Office*